W. D. BURNS.
ROLLER BEARING.
APPLICATION FILED NOV. 27, 1918.
1,303,767.
Patented May 13, 1919.
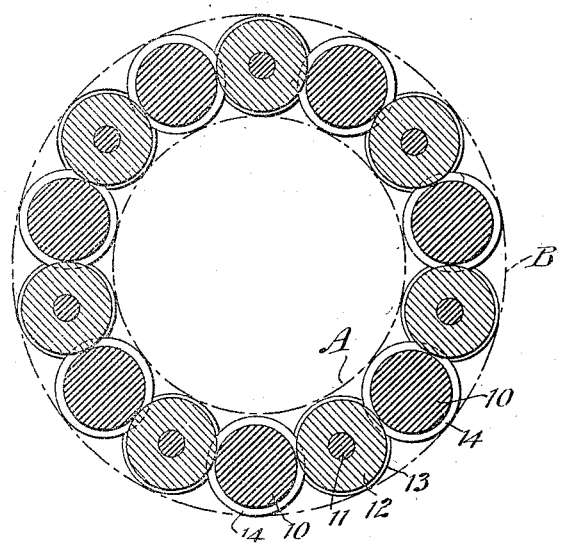
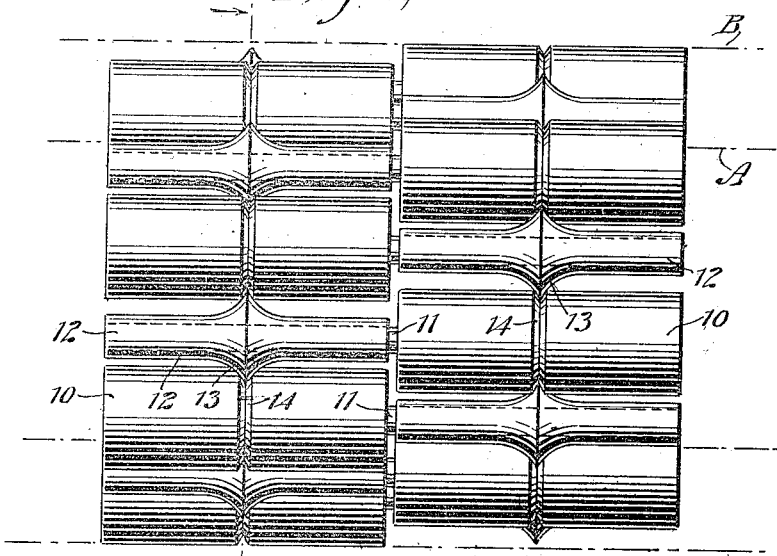
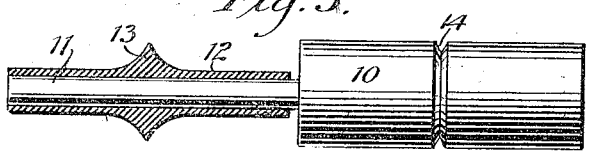
WITNESSES
INVENTOR
W. D. Burns
BY
ATTORNEYS

UNITED STATES PATENT OFFICE.

WILILAM D. BURNS, OF AMENIA, NEW YORK.

ROLLER-BEARING.

1,303,767.

Specification of Letters Patent.

Patented May 13, 1919.

Application filed November 27, 1918. Serial No. 264,411.

*To all whom it may concern:*

Be it known that I, WILLIAM D. BURNS, a citizen of the United States, and a resident of Amenia, in the county of Dutchess and State of New York, have invented a new and Improved Roller-Bearing, of which the following is a description.

The general object of my invention is to provide a roller bearing improved in various particulars, whereby certain advantages and important results are obtained, among which are the following: The rollers are arranged in two annular series, the respective rollers of which are in staggered relation and present overlapping end surfaces; the rollers are reduced at one end to present spindles on which spacing rollers turn; the arrangement serves to minimize the space between the rollers of the bearing as a whole to thereby reduce the tendency of the axle to wedge between the rollers and spread them apart, and, also, sliding friction between the rollers is eliminated.

Other objects and advantages will appear as the description proceeds.

Reference is to be had to the accompanying drawing forming a part of this specification, it being understood that the drawing is merely illustrative of one example of the invention.

Figure 1 is a cross section of a roller bearing embodying my invention, the section being taken on the line 1—1, Fig. 2;

Fig. 2 is a side elevation thereof;

Fig. 3 is a side view of one of the roller bearings and a spacing roller in longitudinal section.

In carrying out my invention in practice, two annular series of rollers 10 are provided, the rollers in the respective series being in staggered relation and the adjacent end surfaces overlapping. Each bearing roller 10 is reduced at one end for approximately one-half of its length to present a spindle 11 rigid with the roller.

Turning on the spindles 11 are spacing rollers 12 each of which preferably has centrally thereon at the periphery, an annular tapered rib or flange 13 which engages in annular grooves 14 in the adjacent bearing rollers 10. The spacing rollers are slightly smaller in diameter than the body portions of the bearing rollers so that said spacing rollers do not contact with either the axle surface indicated at A by dotted lines or the interior surface of the bearing indicated at B by dotted lines.

With the described arrangement endwise friction between the rollers is eliminated and also the space between the rollers is reduced so that the axle will not tend to wedge between the rollers and spread them apart. The arrangement furthermore maintains the rollers in alinement.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a roller bearing, two annular series of load-carrying rollers disposed end to end in staggered relation and each reduced at one end to present a spindle rigid therewith, the adjacent ends of the rollers of the respective series presenting overlapping surfaces, the rollers in the respective series being reversed so that the spindles of one series extend between the rollers of the other series, and spacing rollers loose on said spindles between the load-carrying rollers.

2. In a roller bearing, two annular series of bearing rollers disposed end to end in staggered relation and each reduced at one end to present a spindle rigid therewith, the adjacent ends of the rollers of the respective series presenting overlapping surfaces, the rollers in the respective series being reversed so that the spindles of one series extend between the rollers of the other series, and spacing rollers loose on said spindles, said spacing rollers being of less diameter than the bodies of the bearing rollers and each having approximately central thereof at the periphery tapered annular portions, and the bodies of the bearing rollers having corresponding annular grooves in which said annular portions of the spacing rollers engage.

WILLIAM D. BURNS.